United States Patent
Zeng et al.

(10) Patent No.: US 9,350,614 B2
(45) Date of Patent: May 24, 2016

(54) PREVENTING LOSS OF VIRTUAL MACHINE NETWORK PROFILES

(71) Applicant: Hangzhou H3C Technologies Co., Ltd., Hangzhou, Zhejiang (CN)

(72) Inventors: Yonggang Zeng, Beijing (CN); Yong Guo, Beijing (CN); Ruili Tian, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 317 days.

(21) Appl. No.: 13/905,126

(22) Filed: May 30, 2013

(65) Prior Publication Data

US 2014/0010110 A1 Jan. 9, 2014

(30) Foreign Application Priority Data

Jul. 6, 2012 (CN) .......................... 2012 1 0234811

(51) Int. Cl.
*H04L 12/24* (2006.01)
*G06F 9/455* (2006.01)

(52) U.S. Cl.
CPC ........ *H04L 41/0856* (2013.01); *G06F 9/45558* (2013.01); *H04L 41/0816* (2013.01); *G06F 2009/45595* (2013.01); *H04L 41/0213* (2013.01)

(58) Field of Classification Search
CPC ............ G06F 2009/45562; G06F 2009/45575; G06F 11/1456; G06F 11/1458; G06F 11/1484; G06F 12/16; H04L 49/70; H04L 41/0813; H04L 41/0856
See application file for complete search history.

(56) References Cited

U.S. PATENT DOCUMENTS

2009/0292858 A1* 11/2009 Lambeth et al. ................... 711/6
2011/0238820 A1* 9/2011 Matsuoka ............. G06F 9/5077
709/224

* cited by examiner

*Primary Examiner* — Marsha D Banks Harold
*Assistant Examiner* — Elton Williams
(74) *Attorney, Agent, or Firm* — Patent Law Group LLP (57) ABSTRACT

A network management system deploys a network profile for a virtual machine to a physical switch after a restart of the physical switch when the virtual machine is downstream of the physical switch and the network profile for the virtual machine has been cached but not saved at the physical switch.

13 Claims, 6 Drawing Sheets

PREVENTING LOSS OF VIRTUAL MACHINE NETWORK PROFILES

BACKGROUND

In the virtualization of network resources, a network profile for a virtual machine (VM) is dynamic and migrates as the VM migrates. When a VM migrates or a VM is newly created, the network configuration or profile for the VM should be quickly deployed to the network device (e.g., a physical switch) that connects the VM to the network so the VM can provide prompt, stable, secure, and reliable service to clients.

BRIEF DESCRIPTION OF THE DRAWINGS

In the drawings.

Use of the same reference numbers in different figures indicates similar or identical elements.

DETAILED DESCRIPTION

As used herein, the term "includes" means includes but not limited to, the term "including" means including but not limited to. The terms "a" and "an" are intended to denote at least one of a particular element. The term "based on" means based at least in part on.

After a network profile for a virtual machine (VM) is deployed to a physical switch, the physical switch typically caches the network profile but does not save the network profile automatically in nonvolatile memory. Instead the network profile is saved to the physical switch in a separate operation because the saving operation is time consuming and degrades the performance of the physical switch. If the physical switch frequently receives network profiles and saves them when they are received, the network may become congested. However, if the physical switch does not save network profiles before it abnormally restarts, the physical switch loses unsaved network profiles and impacts the ability of the corresponding VMs to provide service to clients.

To address the above problem, a network management system may determine all the VMs downstream from a physical switch that restarts, and redeploy the network profiles for these VMs to that physical switch. This solution has the following disadvantages.

First, redeploying network profiles for all VMs downstream from a physical switch that experiences a restart takes a long time. For example, a physical switch having 48 downstream ports may be connected to up to 48 physical servers and, assuming each physical server hosts 10 VMs, the physical switch may have 480 downstream VMs. Assuming each network profile takes one (1) second to deploy, it would take eight (8) minutes to deploy all the network profile. For the last issued network profile, the corresponding VM has to wait eight (8) minutes before it may provide service. In fact, the entire process may take more than eight (8) minutes to complete as it often takes longer than one second to deploy a network profile.

Second, while the network profiles are being redeployed, the physical switch is busy for a long time and this degrades the performance of the physical switch.

Therefore, what are needed are method and apparatus that reduce the time to redeploy network profiles after a physical switch experiences a restart and lessen the burden on the physical switch.

In one or more examples of the present disclosure, a network management system detects and records the relationships between physical switches and VMs that are downstream from the physical switches and have cached but unsaved network profiles at the physical switches. When a physical switch restarts, the network management system determines from the relationships if the physical switch has any downstream VMs with unsaved network profiles and deploys only the unsaved network profiles to the physical switch. Periodically the network management system instructs the physical switch to save the unsaved network profiles as the physical switch is listed in the relationships.

In one or more examples of the present disclosure, the network management system includes a Detecting and Recording Unit, a Distributing Unit, and a Saving Unit. The Detecting and Recording Unit records the relationships and detects the restart of the physical switch. The Distributing Unit deploys the unsaved network profiles to the physical switch. The Saving Unit periodically instructs the physical switch to save the unsaved network profiles.

By periodically saving unsaved network profiles to physical switches and only deploying unsaved network profiles after a physical switch restarts, the number of network profiles to be deployed is reduced. This in turn reduces the time to deploy network profiles and lessens the burden on the physical switch.

Figure 1:
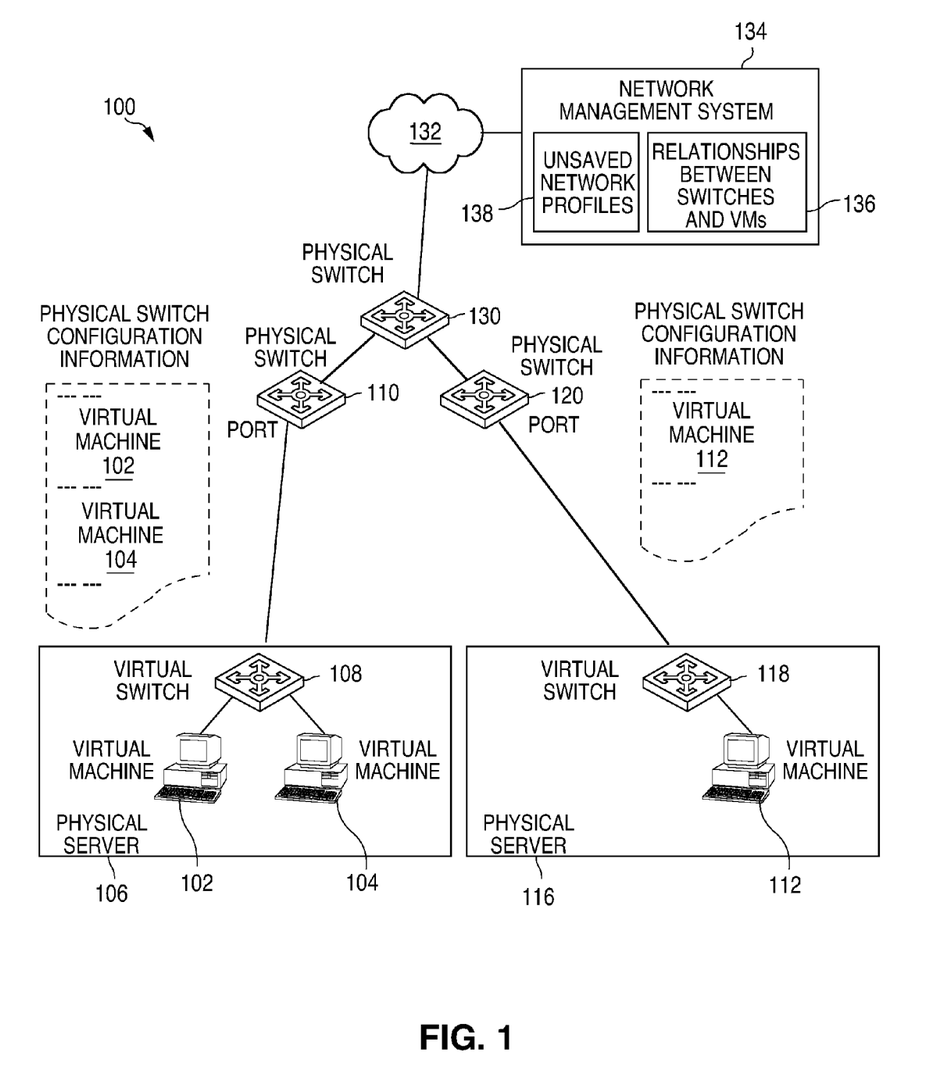
FIG. 1 is a block diagram illustrating part of a computer network in one or more examples of the present disclosure.

FIG. 1 illustrates part of a network 100 in one or more examples of the present disclosure. VMs 102 and 104 run on a physical server 106. A virtual switch 108 on physical server 106 connects VMs 102 and 104 to each other and to a physical switch 110. VMs 102 and 104 are downstream from physical switch 110 as VMs 102 and 104 access network 100 through physical switch 110. Physical switch 110 is configured with network profiles for VMs 102 and 104 to set traffic bandwidth, network security, traffic mirroring, and other network profile parameters.

A VM 112 runs on a physical server 116. A virtual switch 118 on physical server 116 connects VM 112 to a physical switch 120. VM 112 is downstream from physical switch 120 as VM 112 accesses network 100 through physical switch 120. Physical switch 120 is configured with a network profile for VM 112 to set traffic bandwidth, network security, traffic mirroring, and other network profile parameters.

Physical switches 110 and 120 are connected by a physical switch 130 to other portions of network 100 (indicated by a cloud 132). A network management system 134 is connected to cloud 132. Network management system 134 may be software running on a physical server. Alternatively network management system 134 may be a dedicated hardware implemented with application-specific integrated circuits (ASICs) or field-programmable gate arrays (FPGAs). Network management system 134 has saved in memory relationships 136 formed between physical switches and VMs that are downstream from the physical switches and have unsaved network profiles at the physical switches. Network management system 134 also has saved in memory network profiles 138 of at least the VMs in this part of network 100.

Figure 2:
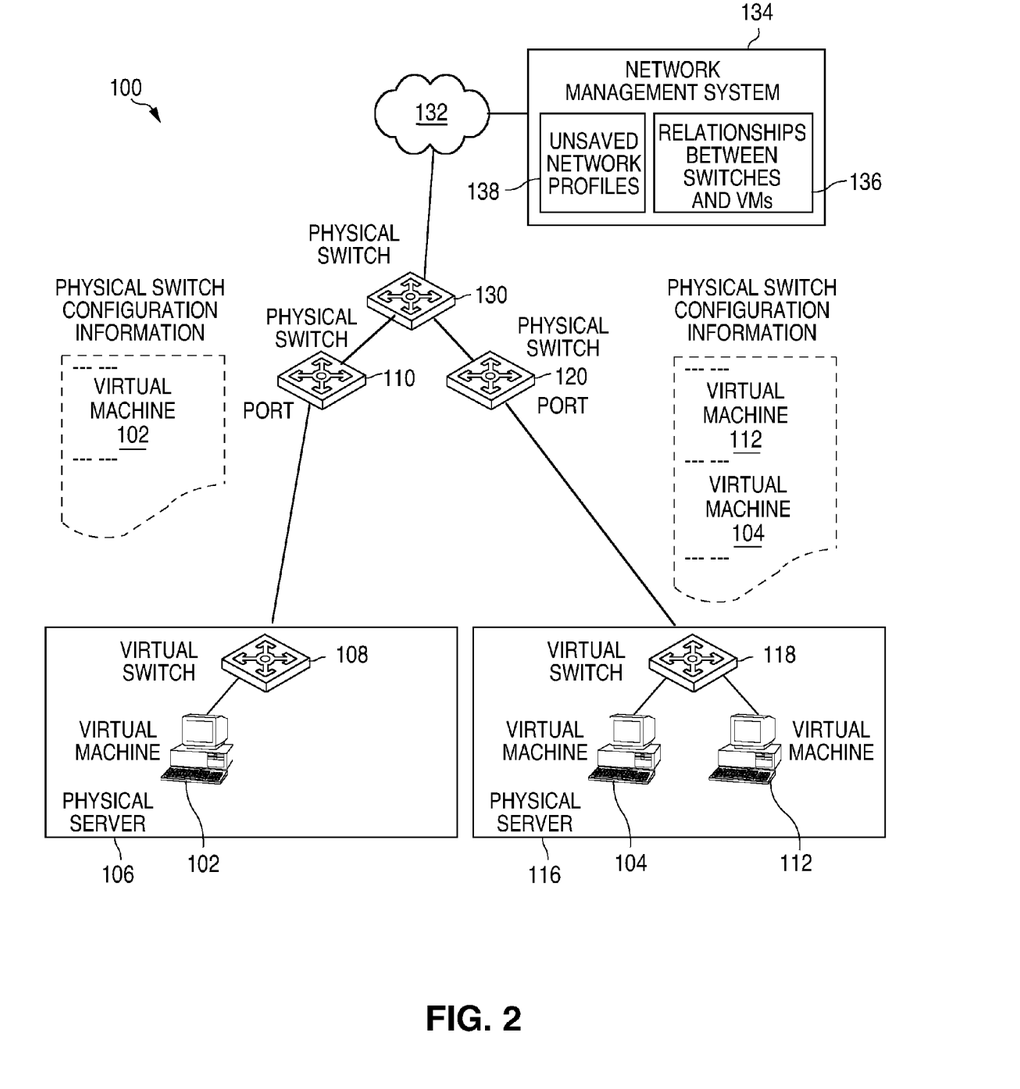
FIG. 2 is a block diagram illustrating the network of FIG. 1 after a virtual machine (VM) migrates from downstream of a first physical switch to downstream of a second physical switch in one or more examples of the present disclosure.
Figure 3:
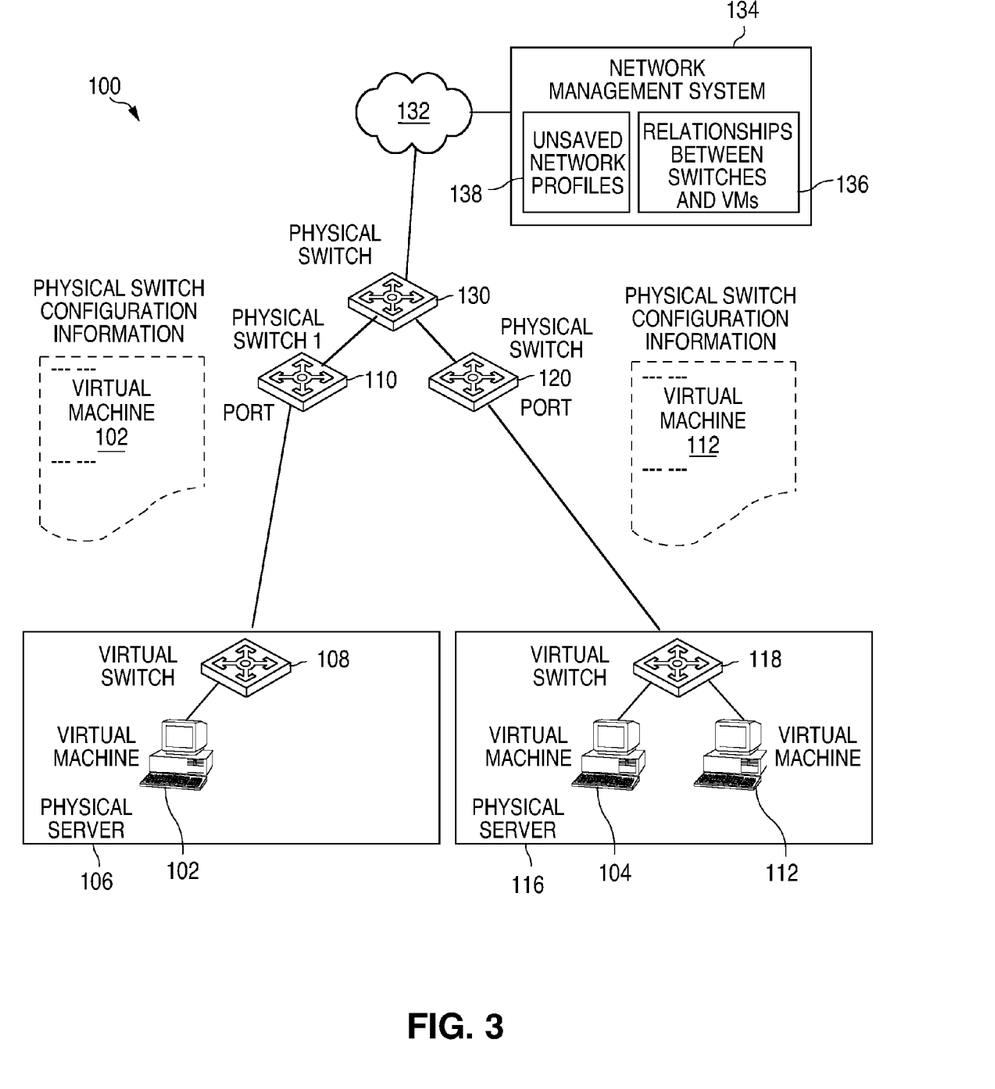
FIG. 3 is a block diagram illustrating the network of FIG. 2 after the second physical switch restarts and loses a network profile for the VM in one or more examples of the present disclosure.

FIG. 2 illustrates network 100 after VM 104 migrates from physical server 106 downstream of physical switch 110 to physical server 116 downstream of physical switch 120 in one or more examples of the present disclosure. FIG. 3 illustrates network 100 after physical switch 120 restarts and loses the network profile for VM 104 in one or more examples of the present disclosure. FIGS. 2 and 3 demonstrate scenarios that are later described to demonstrate examples of the present disclosure.

Figure 4:
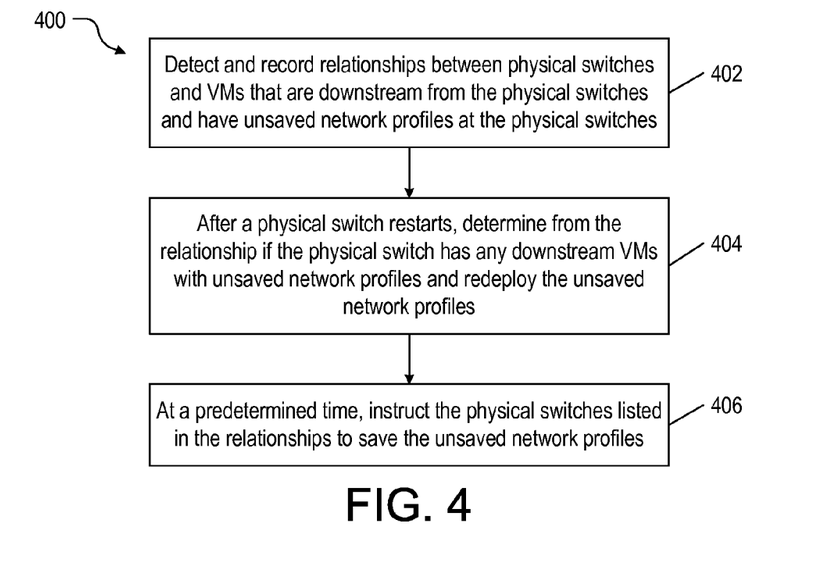
FIG. 4 is a flowchart of a method for a device management system to prevent the loss of VM network profiles in one or more examples of the present disclosure.

FIG. 4 is a flowchart of a method 400 for network management system 134 (FIGS. 1 to 3) to prevent the loss of VM network profiles in one or more examples of the present disclosure. Any method described herein may include one or more operations, functions, or actions illustrated by one or more blocks. Although the blocks are illustrated in sequential orders, these blocks may also be performed in parallel, and/or in a different order than those described herein. Also, the various blocks may be combined into fewer blocks, divided into additional blocks, and/or eliminated based upon the desired implementation. Method 400 begins in block 402.

In block 402, network management system 134 detects and records the relationships formed between physical switches and VMs that are downstream from the physical switches and have unsaved network profiles at the physical switches. Block 402 may be followed by block 404.

In block 404, after a physical switch restarts, network management system 134 determines from relationships 136 (FIG. 1) saved in local memory if the physical switch has any downstream VMs with unsaved network profiles and deploys the unsaved network profiles to the physical switch. Network management 134 deploys the unsaved network profiles by retrieving them from network profiles 138 (FIG. 1) saved in local memory and sending them to the physical switch, which typically caches but does not save the network profiles. Block 404 may be followed by block 406.

In block 406, network management system 134 instructs the physical switches listed in the relationships to save the unsaved network profiles at one or more predetermine times. For example, network management system 134 periodically instructs the physical switches listed in the relationships to save the unsaved network profiles. Each time a physical switch saves network profiles for downstream VMs, the network management system deletes the corresponding relationships between the physical switch and the VMs. Therefore, as the relationships between the physical switch and VMs are deleted after the VM network profiles have been saved to the physical switch, the record in network management system 134 only includes unsaved network profiles. Block 406 may loop back to block 402.

Figure 5:
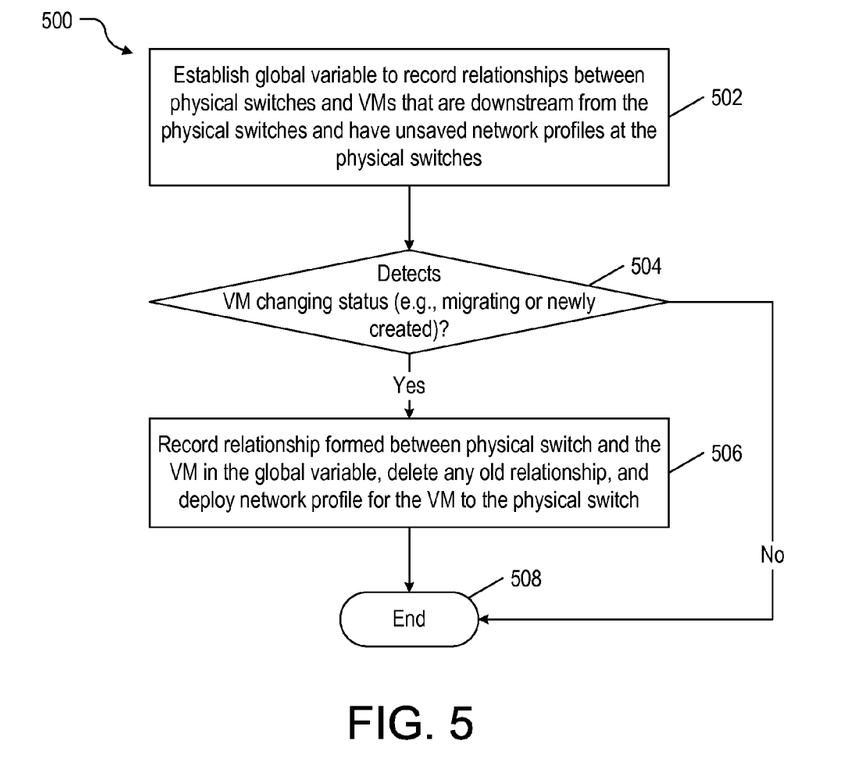
FIG. 5 is a flowchart of a method to implement a block in the method of FIG. 4 in one or more examples of the present disclosure.

FIG. 5 is a flowchart of a method 500 to implement block 402 (FIG. 4) in one or more examples of the present disclosure. Method 500 begins in block 502.

In block 502, network management system 134 (FIG. 1) establishes a global variable to record the relationships formed between physical switches and VMs that are downstream from the physical switches and have unsaved network profiles at the physical switches. The global variable may be std::map<int, std::list<int>>g_oPSswitch2VMsMap, where the first "int" represents an ID of a physical switch and the second "int" represents an ID of a VM. Block 502 may be followed by block 504.

In block 504, network management system 134 determines if it detects a VM changing status. A VM changes status when it migrates from one physical server to another, or when a VM is newly created and added to a physical server. In one or more examples, network management system 134 detects a VM changing status by listening to virtual network events, and the network management system determines the physical switch upstream from the VM based on topology or MAC address learning. When network management system 134 detects a VM changing status, block 504 may be followed by block 506. Otherwise block 504 may be followed by block 508, which ends method 500.

In block 506, network management system 134 records the relationship formed between the physical switch and the VM in the global variable g_oPSswitch2VMsMap. If the VM is migrating from one physical server to another, network management system 134 also deletes any old relationship between another physical switch and the VM from the global variable g_oPSswitch2VMsMap. Network management system 134 then deploys the network profile for the VM to the physical switch. Block 506 may be followed by block 508, which ends method 500.

One example of method 500 is explained in reference to FIGS. 1 and 2. When network management system 134 detects VM 104 is migrating from physical server 106 to physical server 116, network management system 134 determines that VM 104 is downstream from physical switch 120 after migration and records the new relationship formed between physical switch 120 and VM 104 in the global variable g_oPSwitch2VMsMap={{120, {104}}}. Network management system 134 also deploys the network profile for VM 104 to physical switch 120.

Figure 6:
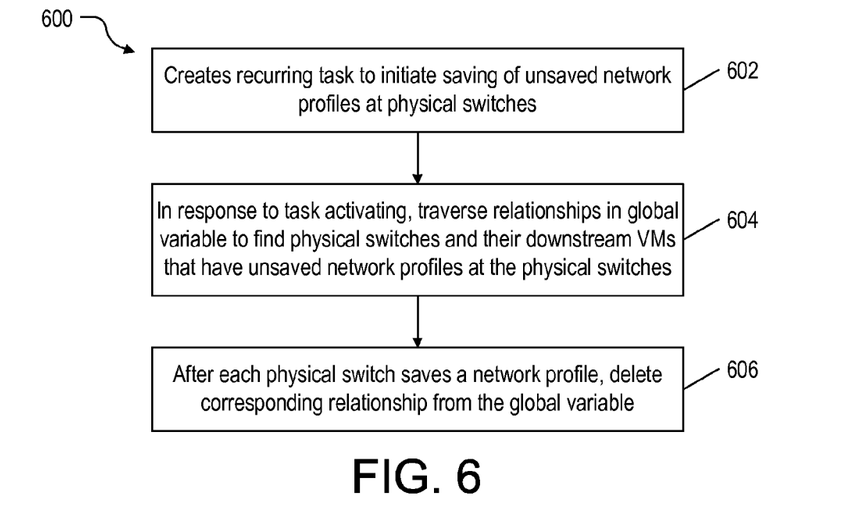
FIG. 6 is a flowchart of a method to implement a block in the method of FIG. 4 in one or more examples of the present disclosure.

FIG. 6 is a flowchart of a method 600 to implement block 406 (FIG. 4) in one or more examples of the present disclosure. Method 600 begins in block 602.

In block 602, network management system 134 (FIG. 1) creates a recurring task. For example, the task may activate once a day at a time when network traffic is light, such as the early morning. The task is to initiate the saving of unsaved network profiles to physical switches. Block 602 may be followed by block 604.

In block 604, the task activates at the predetermined time and in response network management system 134 traverses the relationships in the global variable g_oPSswitch2VMsMap to find all the physical switches and their downstream VMs with unsaved network profiles at the physical switches. Network management system 134 causes the physical switches to save the network profiles. Block 604 may be followed by block 606.

In block 606, after each physical switch saves the network profiles and notifies network management system 134, network management system 134 deletes the corresponding relationships from the global variable g_oPSswitch2VMsMap.

One example of method 600 is explained in references to FIG. 2. When the recurring task is activated, network management system 134 traverses global variable g_oPSwitch2VMMap={{120, {104}}} and saves any unsaved network profiles, such as the network profile for VM 104 in physical switch 120. Once physical switch 120 successfully saves the network profiles, such as the network profile for VM 102, network management system 134 deletes the corresponding relationships between physical switch 120 and VMs, such as the relationship between physical switch 120 and VM 104, from global variable g_oPSwitch2VMMap={{120, {104}}}. The global variable may be empty once all the physical switches have completed their saving operations.

Note that a network profile should not be deployed to a physical switch that is saving network profiles or else the information stored in the global variable g_oPSswitch2VMsMap may be inaccurate. Therefore a network profile deployment to a physical switch should wait until the physical switch completes the saving operation.

Figure 7:
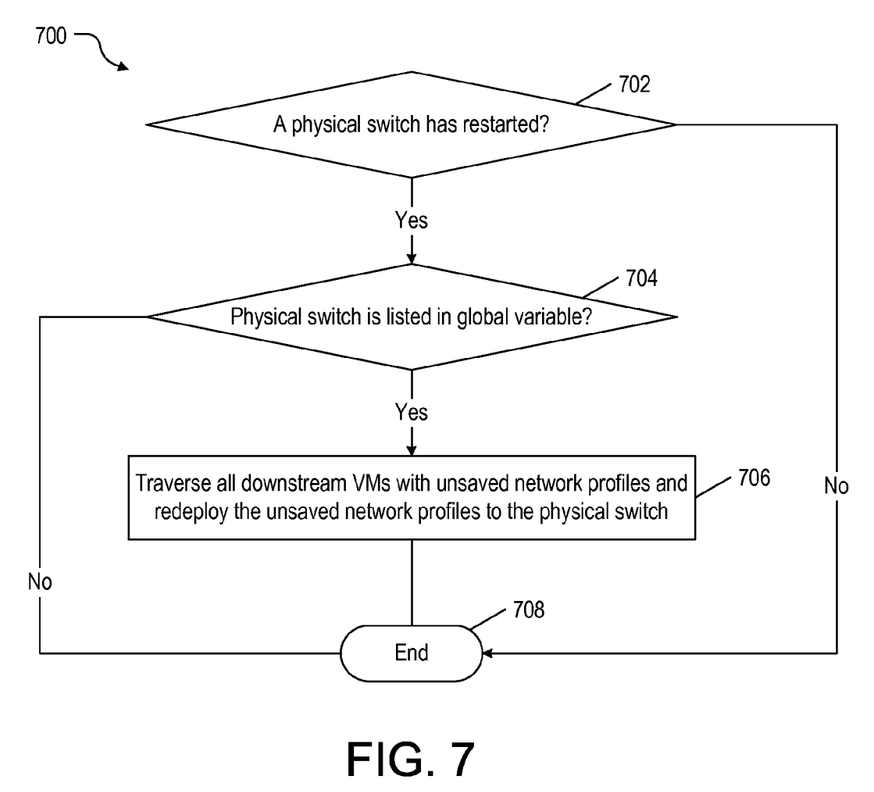
FIG. 7 is a flowchart of a method to implement a block in the method of FIG. 4 in one or more examples of the present disclosure.

FIG. 7 is a flowchart of a method 700 to implement block 404 in one or more examples of the present disclosure. Method 700 begins in block 702.

In block 702, network management system 134 (FIGS. 1 to 3) determines if a physical switch has restarted. For example, network management system 134 detects the restart of a physical switch by receiving SNMP coldStart/warmStart Trap (alert), or by reading the sysUPTime Master Information Base (MIB) node of the physical switch via SNMP. If network management system 134 detects a physical switch has restarted, then block 702 may be followed by block 704. Otherwise block 702 may be followed by block 708, which ends method 700.

In block 704, network management system 134 determines if the restarted physical switch is listed in the relationships in the global variable g_oPSwitch2VMMap. If so, block 702 may be followed by block 706. Otherwise block 704 is followed by block 708, which ends method 700.

In block 706, network management system 134 traverses all the downstream VMs with unsaved network profiles and deploys the unsaved network profiles to the restarted physical switch. Block 706 may be followed by block 708, which ends method 700.

Method 700 is explained in references to FIGS. 1 to 3. When network management system 134 detects VM 104 migrates from physical server 106 to physical server 116, network management system 134 determines that after migration VM 104 is downstream from physical switch 120 and records the new relationship formed between physical switch 120 and VM 104 in the global variable g_oPSwitch2VMsMap={{120, {104}}}. Network management system 134 also deploys the network profile for VM 104 to physical switch 120.

Assuming that physical switch 120 caches but does not save the network profile for VM 104, network management system 134 detects physical switches 110 and 120 have both restarted. In the global variable g_oPSwitch2VMMap, network management system 134 does not find any relationship between physical switch 110 and any downstream VM so network management system 134 does not deploy network profiles to physical switch 110. As a relationship between physical switch 120 and VM 104 is found in the global variable g_oPSwitch2VMMap, network management system 134 knows that physical switch 120 has not saved the network profile for VM 104 so network management system 134 deploys the network profile for VM 104 to physical switch 120.

Thus, examples of the present disclosure track VM state changes and periodically save the VM network profiles on the physical switches. When a physical switch abnormally restarts, only the unsaved network profiles at the physical switches are deployed. Not only does this ensure VM network profiles are not lost, the deployment of VM network profile is fast and the physical switch is not heavily burdened because the number of times network profiles are deployed is small and the saving of network profiles is infrequent (e.g., once a day).

Figure 8:
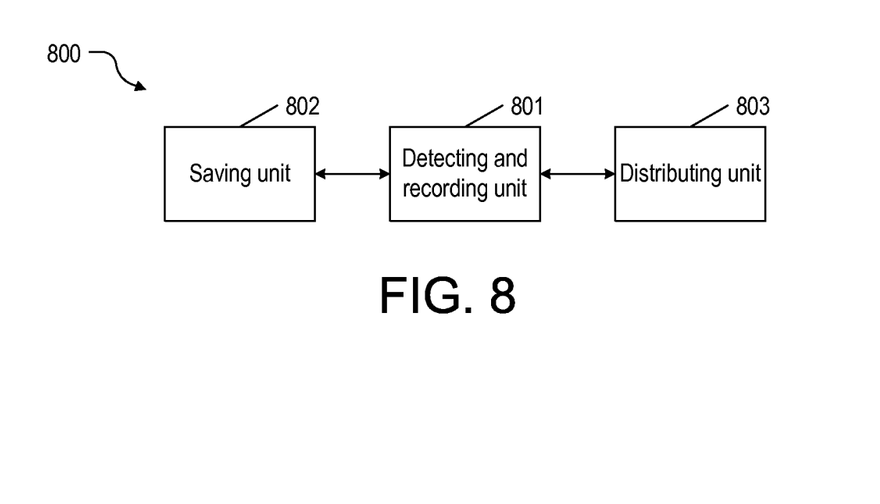
FIG. 8 is a block diagram of a device to implement the network management system of FIGS. 1 to 3 in one or more examples of the present disclosure.
Figure 9:
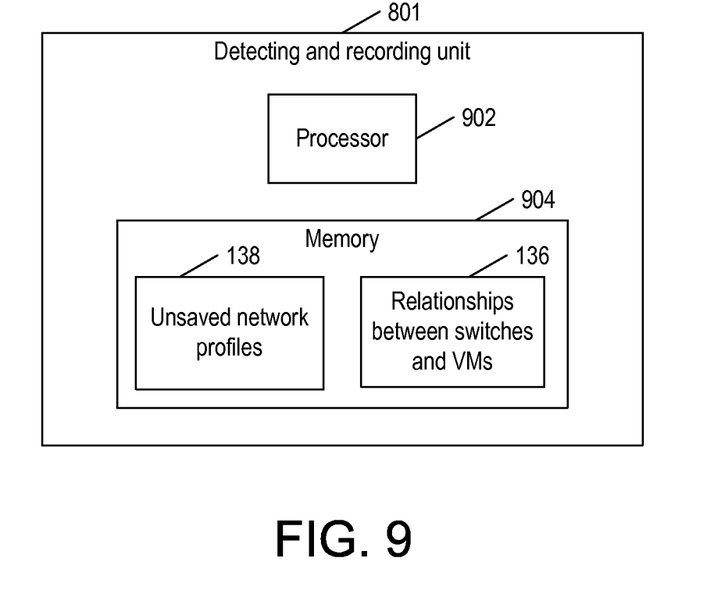
FIG. 9 is a block diagram of a detecting and recording unit in the network management system of FIG. 8 in one or more examples of the present disclosure.

FIG. 8 is a block diagram of a device 800 to implement network management system 134 or components of network management system 134 in one or more examples of the present disclosure. Device 800 includes a Detecting and Recording Unit 801, a Saving Unit 802, and a Distributing Unit 803. Each unit may be implemented to perform its function in hardware or a combination of firmware and hardware. For example, each unit may be implemented with ASICs, FPGAs, or a microprocessor with nonvolatile memory. FIG. 9 shows Detecting and Recording Unit 801 implemented with a microprocessor 902 with nonvolatile memory 904 in one or more examples of the present disclosure.

Referring back to FIG. 8, Detecting and Recording Unit 801 detects status change in VMs and restart of physical switches, and records relationships between physical switches and downstream VMs with unsaved network profiles at the physical switches.

For example, Detecting and Recording Unit 801 detects a status change in a VM by monitoring virtual network events, and senses a physical switch restart by receiving SNMP a coldStart/warmStart Trap or reading the sysUPTime MIB node of the physical switch via SNMP.

When Detecting and Recording Unit 801 detects that a VM has changed status, it records the relationship between a physical switch and the VM in a relationship table at the network management system, and notifies Disturbing Unit 803 to deploy the network profile for the VM to that physical switch.

When Detecting and Recording Unit 801 detects a physical switch restart, it checks for the physical switch in the recorded relationships and notifies Distributing Unit 803 to deploy any unsaved network profiles for downstream VMs to the physical switch.

Furthermore, when the status change is due to a VM migrating, Detecting and Recording Unit 801 deletes any old relationship between another physical switch and the VM.

Based on the recorded relationships in Detecting and Recording Unit 801, Saving Unit 802 periodically instructs the physical switches to save network profiles, such as at a predetermined time once a day.

Note that a network profile should not be deployed to a physical switch that is saving network profiles or else the information stored in the global variable may be inaccurate. Therefore a network profile deployment to a physical switch should wait until the physical switch completes the saving operation.

Furthermore, after a physical switch saves a network profile for a downstream VM, Detecting and Recording Unit 801 deletes the corresponding relationship between the physical switch and the downstream VMs. As the relationship between the physical switch and VM is deleted after the VM network profile has been saved to the physical switch, the record in Detecting and Recording Unit 801 only includes unsaved network profiles.

When Detecting and Recording Unit 801 detects a physical switch restart, Distributing Unit 803 deploys any unsaved network profiles to that physical switch. For example, when Detecting and Recording Unit 801 detects a physical switch has restarted and determines from the recorded relationships that the physical switch has downstream VMs with unsaved network profiles at the physical switch, Detecting and Recording Unit 801 notifies Distributing Unit 803 to deploy the unsaved network profiles to that physical switch. In response to this notification, Distributing Unit 803 deploys the unsaved network profiles to ensure that unsaved network profiles are not lost.

Furthermore, during normal operation of a physical switch and a VM migrates to the physical switch or the VM is newly added to the physical switch, Detecting and Recording Unit 801 will notify Distributing Unit 803 to deploy the network profile for the VM to the physical switch.

By periodically saving VM network profiles, when a physical switch restarts, a smaller number of unsaved VM network profiles would be deployed. In addition, the physical switch is not heavily burdened as the number of times network profiles are deployed is small and the saving of network profiles is infrequent (e.g., once a day).

Various other adaptations and combinations of features of the examples disclosed are within the scope of the present disclosure.

What is claimed is:

1. A method for a network management system to prevent a loss of a network profile for a virtual machine in a network including the network management system, the virtual machine, and a physical switch, the method comprising:
    detecting and recording, by the network management system, a relationship between the physical switch and the virtual machine when the virtual machine is hosted by a physical host downstream from the physical switch and the network profile for the virtual machine is cached but not saved at the physical switch;
    after a restart of the physical switch, deploying, from the network management system to the physical switch, the network profile for the virtual machine hosted by the physical host downstream from the physical switch when the recorded relationship stored at the network management system indicates that the network profile has not been saved at the physical switch;
    after a predefined time, causing, by the network management system, the physical switch to save the network profile for the virtual machine when the recorded relationship indicates that the network profile has not been saved at the physical switch; and
    after the physical switch has saved the network profile for the virtual machine, deleting the recorded relationship.

2. The method of claim 1, wherein detecting and recording the relationship formed between the physical switch and the virtual machine includes:
    establishing a global variable at the network management system; and
    after detecting a change in location of the virtual machine, recording the relationship in the global variable.

3. A network management system to prevent a loss of a network profile for a virtual machine in a network including the network management system, the virtual machine, and a physical switch, comprising:
    a hardware processor; and
    a memory storing instructions that when executed by the hardware processor cause the hardware processor to:
        detect a location change in the virtual machine; record a relationship between the physical switch and the virtual machine when the virtual machine is downstream from the physical switch and the network profile for the virtual machine is cached but not saved at the physical switch;
        deploy the network profile to the physical switch in response to a notification that the physical switch has not saved the network profile for the virtual machine;
        periodically instruct the physical switch to save the network profile for the virtual machine based on the recorded relationship; and
        delete the recorded relationship after the physical switch has saved the new profile for the virtual machine.

4. The network management system of claim 3, wherein the instructions are to cause the hardware processor to sense a status change of the virtual machine, update a relationship table at the network management system with the relationship between the physical switch and the virtual machine, and deploy the network profile for the virtual machine to the physical switch.

5. The network management system of claim 4, wherein the status change in the virtual machine is a migration of the virtual machine, and the instructions are to cause the hardware processor to delete an old relationship between another physical switch and the virtual machine.

6. The network management system of claim 3, wherein the instructions are to cause the hardware processor to, after a restart of the physical switch, deploy the network profile for the virtual machine to the physical switch when the recorded relationship indicates that the network profile has not been saved at the physical switch.

7. The network management system of claim 3, wherein the instructions are to cause the hardware processor to, when the virtual machine is a newly added virtual machine or a migrating virtual machine, deploy the network profile for the virtual machine to the physical switch in response to a notification of the recorded relationship.

8. The method of claim 1, further comprising:
    setting, by the physical switch, traffic bandwidth, network security, or traffic mirroring based on the network profile for the virtual machine.

9. A non-transitory computer-readable storage medium comprising instructions stored thereon that, when executed, cause a processor to:
    detect and record, by a network management system, a relationship between a physical switch and a virtual machine when the virtual machine is hosted by a physical host downstream from the physical switch and a network profile for the virtual machine is cached but not saved at the physical switch;
    after a restart of the physical switch, deploy, from the network management system to the physical switch, the network profile for the virtual machine hosted by the physical host downstream from the physical switch when the recorded relationship stored at the network management system indicates that the network profile has not been saved at the physical switch;
    after a predefined time, cause, by the network management system, the physical switch to save the network profile for the virtual machine when the recorded relationship indicates that the network profile has not been saved at the physical switch; and
    after the physical switch has saved the network profile for the virtual machine, delete, by the network management system, the recorded relationship.

10. The non-transitory computer-readable storage medium of claim 9, wherein the instructions that cause the processor to detect and record the relationship formed between the physical switch and the virtual machine further comprise instructions that cause the processor to:
- establish a global variable at the network management system; and
- after detecting a change in location of the virtual machine, record the relationship in the global variable.

11. The non-transitory computer-readable storage medium of claim 9, further comprising instructions that, when executed, cause the processor to:
- set, by the physical switch, traffic bandwidth, network security, or traffic mirroring based on the network profile for the virtual machine.

12. The non-transitory computer-readable storage medium of claim 9, further comprising instructions that, when executed, cause the processor to:
- when the virtual machine is a newly added virtual machine or a migrating virtual machine, deploy the network profile for the virtual machine to the physical switch in response to a notification of the recorded relationship.

13. The non-transitory computer-readable storage medium of claim 9, further comprising instructions that, when executed, cause the processor to:
- sense a status change of the virtual machine;
- update a relationship table at the network management system with the relationship between the physical switch and the virtual machine; and
- deploy the network profile for the virtual machine to the physical switch.

* * * * *